(12) United States Patent
Dubey

(10) Patent No.: US 11,418,445 B2
(45) Date of Patent: *Aug. 16, 2022

(54) INSTALLATION OF ROUTING TABLES FOR LOGICAL ROUTER IN ROUTE SERVER MODE

(71) Applicant: Nicira, Inc., Palo Alto, CA (US)

(72) Inventor: Ankur Dubey, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/945,910

(22) Filed: Aug. 2, 2020

(65) Prior Publication Data

US 2020/0366606 A1    Nov. 19, 2020

Related U.S. Application Data

(63) Continuation of application No. 16/216,936, filed on Dec. 11, 2018, now Pat. No. 10,749,801, which is a (Continued)

(51) Int. Cl.
*H04L 45/745* (2022.01)
*H04L 45/44* (2022.01)
*H04L 47/24* (2022.01)

(52) U.S. Cl.
CPC ............ *H04L 45/745* (2013.01); *H04L 45/44* (2013.01); *H04L 47/24* (2013.01)

(58) Field of Classification Search
None
See application file for complete search history.

(56) References Cited

U.S. PATENT DOCUMENTS 5,504,921 A    4/1996    Dev et al.
5,550,816 A    8/1996    Hardwick et al.
(Continued)

FOREIGN PATENT DOCUMENTS

CN    1442987 A    9/2003
CN    1714548 A    12/2005
(Continued)

OTHER PUBLICATIONS

Agarwal, Sugam, et al., "Traffic Engineering in Software Defined Networks," 2013 Proceedings IEEE Infocom, Apr. 14, 2013, 10 pages, Bell Labs, Alcatel-Lucent, Holmdel, NJ, USA.
(Continued)

*Primary Examiner* — Jamaal Henson
(74) *Attorney, Agent, or Firm* — Adeli LLP

(57) ABSTRACT

Some embodiments provide a method for a network controller operating on a host machine that hosts a particular one of multiple centralized routing components for a logical router. The method receives a routing table from a routing protocol application operating on the host machine. Each of the other centralized routing components operates on a different host machine and implements a different interface of the logical router that connects to at least one physical router external to the logical network. The routing protocol application operates as a router server for all of the centralized routing components. For each of the other centralized routing components, the method identifies a set of routes in the routing table to distribute to the centralized routing component. The method sends the identified routes for each centralized routing component to the centralized routing component.

20 Claims, 10 Drawing Sheets

Related U.S. Application Data continuation of application No. 15/197,713, filed on Jun. 29, 2016, now Pat. No. 10,153,973.

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,914,907 B1 | 7/2005 | Bhardwaj et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,107,356 B2 | 9/2006 | Baxter et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,653,747 B2 | 1/2010 | Lucco et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,778,268 B2 | 8/2010 | Khan et al. |
| 7,792,097 B1 | 9/2010 | Wood et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,881,208 B1 | 2/2011 | Nosella et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,987,506 B1 | 7/2011 | Khalid et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Mian et al. |
| 8,224,931 B1 | 7/2012 | Brandwine et al. |
| 8,224,971 B1 * | 7/2012 | Miller ............... H04L 41/5096 370/254 |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,416,709 B1 | 4/2013 | Marshall et al. |
| 8,456,984 B2 | 6/2013 | Ranganathan et al. |
| 8,504,718 B2 | 8/2013 | Wang et al. |
| 8,559,324 B1 | 10/2013 | Brandwine et al. |
| 8,565,108 B1 | 10/2013 | Marshall et al. |
| 8,600,908 B2 | 12/2013 | Lin et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,724,456 B1 | 5/2014 | Hong et al. |
| 8,745,177 B1 | 6/2014 | Kazerani et al. |
| 8,958,298 B2 | 2/2015 | Zhang et al. |
| 9,021,066 B1 | 4/2015 | Singh et al. |
| 9,032,095 B1 | 5/2015 | Traina et al. |
| 9,036,504 B1 | 5/2015 | Miller et al. |
| 9,036,639 B2 | 5/2015 | Zhang |
| 9,059,999 B2 | 6/2015 | Koponen et al. |
| 9,137,052 B2 | 9/2015 | Koponen et al. |
| 9,313,129 B2 | 4/2016 | Ganichev et al. |
| 9,363,172 B2 * | 6/2016 | Luxenberg ............... H04L 45/64 |
| 9,385,925 B1 | 7/2016 | Scholl |
| 9,419,855 B2 | 8/2016 | Ganichev et al. |
| 9,454,392 B2 * | 9/2016 | Luxenberg .......... H04L 49/9005 |
| 9,485,149 B1 | 11/2016 | Traina et al. |
| 9,503,321 B2 | 11/2016 | Neginhal et al. |
| 9,559,980 B2 | 1/2017 | Li et al. |
| 9,647,883 B2 | 5/2017 | Neginhal et al. |
| 9,749,214 B2 | 8/2017 | Han |
| 9,787,605 B2 | 10/2017 | Zhang et al. |
| 9,948,472 B2 | 4/2018 | Drake et al. |
| 10,057,157 B2 | 8/2018 | Goliya et al. |
| 10,075,363 B2 | 9/2018 | Goliya et al. |
| 10,079,779 B2 | 9/2018 | Zhang et al. |
| 10,095,535 B2 | 10/2018 | Dubey et al. |
| 10,110,431 B2 | 10/2018 | Ganichev et al. |
| 10,129,142 B2 | 11/2018 | Goliya et al. |
| 10,129,180 B2 | 11/2018 | Zhang et al. |
| 10,153,973 B2 | 12/2018 | Dubey |
| 10,230,629 B2 | 3/2019 | Masurekar et al. |
| 10,270,687 B2 | 4/2019 | Mithyantha |
| 10,341,236 B2 | 7/2019 | Boutros et al. |
| 10,382,321 B1 | 8/2019 | Boyapati et al. |
| 10,411,955 B2 | 9/2019 | Neginhal et al. |
| 10,454,758 B2 | 10/2019 | Boutros et al. |
| 10,601,700 B2 | 3/2020 | Goliya et al. |
| 10,623,322 B1 | 4/2020 | Nallamothu |
| 10,700,996 B2 | 6/2020 | Zhang et al. |
| 10,749,801 B2 | 8/2020 | Dubey |
| 10,795,716 B2 | 10/2020 | Dubey et al. |
| 10,797,998 B2 | 10/2020 | Basavaraj et al. |
| 10,805,212 B2 | 10/2020 | Masurekar et al. |
| 10,911,360 B2 | 2/2021 | Boutros et al. |
| 10,931,560 B2 | 2/2021 | Goliya et al. |
| 10,938,788 B2 | 3/2021 | Wang et al. |
| 11,252,024 B2 | 2/2022 | Neginhal et al. |
| 2001/0043614 A1 | 11/2001 | Viswanadham et al. |
| 2002/0067725 A1 | 6/2002 | Oguchi et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |

(56) References Cited

U.S. PATENT DOCUMENTS

| | | |
|---|---|---|
| 2003/0067924 A1 | 4/2003 | Choe et al. |
| 2003/0069972 A1 | 4/2003 | Yoshimura et al. |
| 2004/0013120 A1 | 1/2004 | Shen |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0050719 A1 | 3/2006 | Barr et al. |
| 2006/0056412 A1 | 3/2006 | Page |
| 2006/0059253 A1 | 3/2006 | Goodman et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0203774 A1 | 9/2006 | Carrion-Rodrigo |
| 2006/0291387 A1 | 12/2006 | Kimura et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0165515 A1 | 7/2007 | Vasseur |
| 2007/0201357 A1 | 8/2007 | Smethurst et al. |
| 2007/0206591 A1 | 9/2007 | Doviak et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0186968 A1 | 8/2008 | Farinacci et al. |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0253396 A1 | 10/2008 | Olderdissen |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |
| 2009/0067427 A1 | 3/2009 | Rezaki et al. |
| 2009/0083445 A1 | 3/2009 | Ganga |
| 2009/0092043 A1 | 4/2009 | Lapuh et al. |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0252173 A1 | 10/2009 | Sampath et al. |
| 2009/0257440 A1 | 10/2009 | Yan et al. |
| 2009/0262741 A1 | 10/2009 | Jungck et al. |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0290485 A1 | 11/2010 | Martini et al. |
| 2010/0317376 A1 | 12/2010 | Anisimov et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0151443 A1 | 6/2012 | Rohde et al. |
| 2012/0155467 A1* | 6/2012 | Appenzeller ........ H04L 49/3009 370/392 |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0058225 A1* | 3/2013 | Casado ............... H04L 49/3063 370/392 |
| 2013/0058229 A1 | 3/2013 | Casado et al. |
| 2013/0058335 A1 | 3/2013 | Koponen et al. |
| 2013/0058346 A1 | 3/2013 | Sridharan et al. |
| 2013/0058350 A1 | 3/2013 | Fulton |
| 2013/0058353 A1 | 3/2013 | Koponen et al. |
| 2013/0060940 A1 | 3/2013 | Koponen et al. |
| 2013/0070762 A1 | 3/2013 | Adams et al. |
| 2013/0091254 A1 | 4/2013 | Haddad et al. |
| 2013/0094350 A1* | 4/2013 | Mandal ............... H04L 41/0668 370/400 |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0208621 A1 | 8/2013 | Manghirmalani et al. |
| 2013/0212148 A1 | 8/2013 | Koponen et al. |
| 2013/0223444 A1 | 8/2013 | Liljenstolpe et al. |
| 2013/0230047 A1* | 9/2013 | Subrahmaniam ... H04L 47/2441 370/392 |
| 2013/0266007 A1 | 10/2013 | Kumbhare et al. |
| 2013/0266015 A1 | 10/2013 | Qu et al. |
| 2013/0266019 A1 | 10/2013 | Qu et al. |

(56) References Cited

U.S. PATENT DOCUMENTS

| | | | |
|---|---|---|---|
| 2013/0268799 A1 | 10/2013 | Mestery et al. | |
| 2013/0329548 A1 | 12/2013 | Nakil et al. | |
| 2013/0332602 A1 | 12/2013 | Nakil et al. | |
| 2013/0332619 A1 | 12/2013 | Xie et al. | |
| 2013/0339544 A1 | 12/2013 | Mithyantha | |
| 2014/0003434 A1 | 1/2014 | Assarpour et al. | |
| 2014/0016501 A1 | 1/2014 | Kamath et al. | |
| 2014/0059226 A1* | 2/2014 | Messerli | H04L 12/4641 709/226 |
| 2014/0063364 A1* | 3/2014 | Hirakata | G06F 3/0412 445/24 |
| 2014/0114998 A1* | 4/2014 | Kadam | G06F 16/95 707/758 |
| 2014/0126418 A1 | 5/2014 | Brendel et al. | |
| 2014/0146817 A1 | 5/2014 | Zhang | |
| 2014/0149490 A1* | 5/2014 | Luxenberg | G06F 15/00 709/203 |
| 2014/0173093 A1 | 6/2014 | Rabeela et al. | |
| 2014/0195666 A1 | 7/2014 | Dumitriu et al. | |
| 2014/0229945 A1 | 8/2014 | Barkai et al. | |
| 2014/0241247 A1* | 8/2014 | Kempf | H04W 76/12 370/328 |
| 2014/0269299 A1 | 9/2014 | Koomstra | |
| 2014/0328350 A1* | 11/2014 | Hao | H04L 45/74 370/401 |
| 2014/0348166 A1 | 11/2014 | Yang et al. | |
| 2014/0372582 A1* | 12/2014 | Ghanwani | G06F 9/45533 709/223 |
| 2014/0376550 A1 | 12/2014 | Khan et al. | |
| 2015/0009831 A1 | 1/2015 | Graf | |
| 2015/0016300 A1 | 1/2015 | Devireddy et al. | |
| 2015/0055650 A1 | 2/2015 | Bhat et al. | |
| 2015/0063360 A1 | 3/2015 | Thakkar et al. | |
| 2015/0063364 A1* | 3/2015 | Thakkar | H04L 45/7453 370/401 |
| 2015/0089082 A1* | 3/2015 | Patwardhan | H04L 45/44 709/243 |
| 2015/0092594 A1 | 4/2015 | Zhang et al. | |
| 2015/0098475 A1 | 4/2015 | Jayanarayana et al. | |
| 2015/0103838 A1 | 4/2015 | Zhang et al. | |
| 2015/0124586 A1 | 5/2015 | Pani | |
| 2015/0124810 A1 | 5/2015 | Hao et al. | |
| 2015/0172156 A1 | 6/2015 | Lohiya et al. | |
| 2015/0188770 A1* | 7/2015 | Naiksatam | H04L 47/2408 370/254 |
| 2015/0222550 A1 | 8/2015 | Anand | |
| 2015/0263897 A1 | 9/2015 | Ganichev et al. | |
| 2015/0263946 A1* | 9/2015 | Tubaltsev | H04L 49/354 370/392 |
| 2015/0263952 A1 | 9/2015 | Ganichev et al. | |
| 2015/0271011 A1 | 9/2015 | Neginhal et al. | |
| 2015/0271303 A1 | 9/2015 | Neginhal et al. | |
| 2015/0281067 A1 | 10/2015 | Wu | |
| 2015/0299880 A1* | 10/2015 | Jorge | C25C 3/085 205/560 |
| 2015/0372869 A1 | 12/2015 | Rao et al. | |
| 2016/0105471 A1 | 4/2016 | Nunes et al. | |
| 2016/0119229 A1 | 4/2016 | Zhou | |
| 2016/0134513 A1 | 5/2016 | Yang et al. | |
| 2016/0149808 A1 | 5/2016 | Cai et al. | |
| 2016/0182287 A1 | 6/2016 | Chiba et al. | |
| 2016/0191374 A1 | 6/2016 | Singh et al. | |
| 2016/0226700 A1 | 8/2016 | Zhang et al. | |
| 2016/0226754 A1 | 8/2016 | Zhang et al. | |
| 2016/0226762 A1 | 8/2016 | Zhang et al. | |
| 2016/0261493 A1 | 9/2016 | Li | |
| 2016/0294612 A1 | 10/2016 | Ravinoothala et al. | |
| 2016/0330120 A1 | 11/2016 | Thyamagundalu et al. | |
| 2016/0344586 A1 | 11/2016 | Ganichev et al. | |
| 2016/0352633 A1 | 12/2016 | Kapadia et al. | |
| 2017/0005923 A1 | 1/2017 | Babakian | |
| 2017/0048129 A1 | 2/2017 | Masurekar et al. | |
| 2017/0048130 A1 | 2/2017 | Goliya et al. | |
| 2017/0063632 A1 | 3/2017 | Goliya et al. | |
| 2017/0063633 A1 | 3/2017 | Goliya et al. | |
| 2017/0064717 A1 | 3/2017 | Filsfils et al. | |
| 2017/0070425 A1 | 3/2017 | Mithyantha | |
| 2017/0085502 A1 | 3/2017 | Biruduraju | |
| 2017/0126497 A1 | 5/2017 | Dubey et al. | |
| 2017/0180154 A1 | 6/2017 | Duong et al. | |
| 2017/0207992 A1 | 7/2017 | Huang et al. | |
| 2017/0230241 A1 | 8/2017 | Neginhal et al. | |
| 2017/0288981 A1 | 10/2017 | Hong et al. | |
| 2017/0317919 A1 | 11/2017 | Fernando et al. | |
| 2018/0006943 A1 | 1/2018 | Dubey | |
| 2018/0062914 A1 | 3/2018 | Boutros et al. | |
| 2018/0097734 A1 | 4/2018 | Boutros et al. | |
| 2018/0159821 A1 | 6/2018 | Chanda et al. | |
| 2018/0367442 A1 | 12/2018 | Goliya et al. | |
| 2019/0018701 A1 | 1/2019 | Dubey et al. | |
| 2019/0020580 A1 | 1/2019 | Boutros et al. | |
| 2019/0020600 A1 | 1/2019 | Zhang et al. | |
| 2019/0109780 A1 | 4/2019 | Nagarkar | |
| 2019/0124004 A1 | 4/2019 | Dubey | |
| 2019/0190885 A1 | 6/2019 | Krug et al. | |
| 2019/0199625 A1 | 6/2019 | Masurekar et al. | |
| 2019/0245783 A1 | 8/2019 | Mithyantha | |
| 2019/0281133 A1 | 9/2019 | Tomkins | |
| 2019/0312603 A1 | 10/2019 | Boutros et al. | |
| 2019/0334767 A1 | 10/2019 | Neginhal et al. | |
| 2019/0372895 A1 | 12/2019 | Parthasarathy et al. | |
| 2020/0021483 A1 | 1/2020 | Boutros et al. | |
| 2020/0169496 A1 | 5/2020 | Goliya et al. | |
| 2020/0186468 A1 | 6/2020 | Basavaraj et al. | |
| 2020/0195607 A1 | 6/2020 | Wang et al. | |
| 2020/0220802 A1 | 7/2020 | Goliya et al. | |
| 2020/0267095 A1 | 8/2020 | Zhang et al. | |
| 2021/0019174 A1 | 1/2021 | Dubey et al. | |
| 2021/0029028 A1 | 1/2021 | Masurekar et al. | |

FOREIGN PATENT DOCUMENTS

| | | |
|---|---|---|
| CN | 101005452 A | 7/2007 |
| CN | 102461098 A | 5/2012 |
| CN | 102726007 A | 10/2012 |
| CN | 102780605 A | 11/2012 |
| CN | 102986172 A | 3/2013 |
| CN | 103546381 A | 1/2014 |
| CN | 103890751 A | 6/2014 |
| CN | 103917967 A | 7/2014 |
| CN | 103947164 A | 7/2014 |
| CN | 104009929 A | 8/2014 |
| CN | 104335553 A | 2/2015 |
| CN | 105791412 A | 7/2016 |
| CN | 105791463 A | 7/2016 |
| EP | 1653688 A1 | 5/2006 |
| EP | 2672668 A1 | 12/2013 |
| EP | 2838244 A2 | 2/2015 |
| EP | 3013006 A1 | 4/2016 |
| JP | 2000244567 A | 9/2000 |
| JP | 2003069609 A | 3/2003 |
| JP | 2003124976 A | 4/2003 |
| JP | 2003318949 A | 11/2003 |
| JP | 2004134967 A | 4/2004 |
| JP | 2011139299 A | 7/2011 |
| JP | 2011228864 A | 11/2011 |
| JP | 2013157855 A | 8/2013 |
| JP | 2014531831 A | 11/2014 |
| JP | 2014534789 A | 12/2014 |
| KR | 1020110099579 A | 9/2011 |
| WO | 2005112390 A1 | 11/2005 |
| WO | 2008095010 A1 | 8/2008 |
| WO | 2013020126 A1 | 2/2013 |
| WO | 2013026049 A1 | 2/2013 |
| WO | 2013055697 A1 | 4/2013 |
| WO | 2013081962 A1 | 6/2013 |
| WO | 2013143611 A1 | 10/2013 |
| WO | 2013184846 A1 | 12/2013 |
| WO | 2015015787 A1 | 2/2015 |
| WO | 2015142404 A1 | 9/2015 |
| WO | 2016123550 A1 | 8/2016 |
| WO | 2017027073 A1 | 2/2017 |
| WO | 2018044746 A1 | 3/2018 |

(56) References Cited

FOREIGN PATENT DOCUMENTS

OTHER PUBLICATIONS

Aggarwal, R., et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.
Author Unknown, "Cisco Border Gateway Protocol Control Plane for Virtual Extensible LAN," White Paper, Jan. 23, 2015, 6 pages, Cisco Systems, Inc.
Author Unknown, "Cisco Data Center Spine-and-Leaf Architecture: Design Overview," White Paper, Apr. 15, 2016, 27 pages, Cisco Systems, Inc.
Author Unknown, "Defining Security Policies for Policy-based and Route-based VPNs," Month Unknown 2018, 5 pages, Fortinet, Inc., retrieved at http://help.fortinet.com/fos50hlp/54/Content/FortiOS/fortigate-ipsecvpn-54/Defining_VPN_Policies/Defining_Policies_for_Policy_and_Route.htm.
Author Unknown, "VMware® NSX Network Virtualization Design Guide," Month Unknown 2013, 32 pages, Item No. VMW-NSX-NTWK-VIRT-DESN-GUIDE-V2-101, VMware, Inc., Palo Alto, CA, USA.
Ballani, Hitesh, et al., "Making Routers Last Longer with ViAggre," NSDI '09: 6th USENIX Symposium on Networked Systems Design and Implementation, Apr. 2009, 14 pages, USENIX Association.
Berger, L., et al., "The OSPF Opaque LSA Option," Jul. 2008, 17 pages, RFC 5250, IETF.
Caesar, Matthew, et al., "Design and Implementation of a Routing Control Platform," NSDI '05: 2nd Symposium on Networked Systems Design & Implementation, Apr. 2005, 14 pages, Usenix Association.
Dobrescu, Mihai, et al., "RouteBricks: Exploiting Parallelism To Scale Software Routers," SOSP'09, Proceedings of the ACM SIGOPS 22nd Symposium on Operating Systems Principles, Oct. 2009, 17 pages, ACM, New York, NY.
Dumitriu, Dan Mihai, et al., (U.S. Appl. No. 61/514,990), filed Aug. 4, 2011, 31 pages.
Fernando, Rex, et al., "Service Chaining using Virtual Networks with BGP," Internet Engineering Task Force, IETF, Jul. 7, 2015, 32 pages, Internet Society (ISOC), Geneva, Switzerland, available at https://tools.ietf.org/html/draft-fm-bess-service-chaining-01.
Halpern, J., et al., "Service Function Chaining (SFC) Architecture," RFC7665, Oct. 2015, 32 pages, IETF.
Handley, Mark, et al., "Designing Extensible IP Router Software," Proc. of NSDI, May 2005, 14 pages.
Keller, Ralph, "Dissemination of Application-Specific Information using the OSPF Routing Protocol," TIK Report Nr. 181, Nov. 2003, 12 pages, EIH Zurich, Switzerland.
Kim, Changhoon, et al., "Revisiting Route Caching: The World Should be Flat," in Proc. of International Conference on Passive and Active Network Measurement, Apr. 2009, 10 pages, Springer, Berlin, Heidelberg.
Koponen, Teemu, et al., "Network Virtualization in Multi-tenant Datacenters," Technical Report TR-2013-001E, Aug. 2013, 22 pages, VMware, Inc., Palo Alto, CA, USA.
Lakshminarayanan, Karthik, et al., "Routing as a Service," Report No. UCB/CSD-04-1327, Month Unknown 2004, 16 pages, Computer Science Division (EECS), University of California—Berkeley, Berkeley, California.
Lowe, Scott, "Learning NSX, Part 14: Using Logical Routing," Scott's Weblog: The weblog of an IT pro specializing in cloud computing, virtualization, and networking, all with an open source view, Jun. 20, 2014, 8 pages, available at https://blog.scottlowe.org/2014/06/20/learning-nsx-part-14-using-logical-routing/.
Maltz, David A., et al., "Routing Design in Operational Networks: A Look from the Inside," SIGCOMM '04, Aug. 30-Sep. 3, 2004, 14 pages, ACM, Portland, Oregon, USA.
Moreno, Victor, "VXLAN Deployment Models—A Practical Perspective," Cisco Live 2015 Melbourne, Mar. 6, 2015, 72 pages, BRKDCT-2404, Cisco Systems, Inc.
Non-published commonly owned U.S. Appl. No. 16/868,524, filed May 6, 2020, 105 pages, Nicira, Inc.
Pelissier, Joe, "Network Interface Virtualization Review," Jan. 2009, 38 pages.
Rosen, E., "Applicability Statement for BGP/MPLS IP Virtual Private Networks (VPNs)," RFC 4365, Feb. 2006, 32 pages, The Internet Society.
Sajassi, Ali, et al., "Integrated Routing and Bridging in EVPN draft-sajassi-12vpn-evpn-inter-subnet-forwarding-04", Jul. 4, 2014, 24 pages.
Shenker, Scott, et al., "The Future of Networking, and the Past of Protocols," Dec. 2, 2011, 30 pages, USA.
Wang, Anjing, et al., "Network Virtualization: Technologies, Perspectives, and Frontiers," Journal of Lightwave Technology, Feb. 15, 2013, 15 pages, IEEE.
Wang, Yi, et al., "Virtual Routers on the Move: Live Router Migration as a Network-Management Primitive," SIGCOMM '08, Aug. 17-22, 2008, 12 pages, ACM, Seattle, Washington, USA.
Wang, Yushun, et al., "Connect Azure VPN gateways to multiple on-premises policy-based VPN devices using PowerShell," VPN Gateway Documentation, Apr. 18, 2018, 5 pages, retrieved at https://docs.microsoft.com/en-us/azure/vpn-gateway/vpn-gateway-connect-multiple-policybased-rm-ps.
Non-published commonly owned U.S. Appl. No. 17/062,531, filed Oct. 2, 2020, 75 pages, Nicira, Inc.
Non-published commonly owned U.S. Appl. No. 17/068,588, filed Oct. 12, 2020, 75 pages, Nicira, Inc.
Non-Published Commonly Owned Related U.S. Appl. No. 17/579,513, filed Jan. 19, 2022, 91 pages, Nicira, Inc.
Non-Published Commonly Owned Related U.S. Appl. No. 17/580,596, filed Jan. 20, 2022, 103 pages, Nicira, Inc.

* cited by examiner

INSTALLATION OF ROUTING TABLES FOR LOGICAL ROUTER IN ROUTE SERVER MODE

CLAIM OF BENEFIT TO PRIOR APPLICATIONS

This application is a continuation application of U.S. patent application Ser. No. 16/216,936, filed Dec. 11, 2018, now published as U.S. Patent Publication 2019/0124004. U.S. patent application Ser. No. 16/216,936 is a continuation application of U.S. patent application Ser. No. 15/197,713, filed Jun. 29, 2016, now issued as U.S. Pat. No. 10,153,973. U.S. patent application Ser. No. 16/216,936, now published as U.S. Patent Publication 2019/0124004 and U.S. patent application Ser. No. 15/197,713, now issued as U.S. Pat. No. 10,153,973 are incorporated herein by reference.

BACKGROUND

Typical physical networks contain several physical routers to perform L3 forwarding (i.e., routing). When a first machine wants to send a packet to a second machine located on a different IP subnet, the packet is sent to a router that uses a destination IP address of the packet to determine through which of its physical interfaces the packet should be sent. Larger networks will contain multiple routers, such that if one of the routers fails, the packets can be routed along a different path between the first machine and the second machine. Both within a contained network and across network boundaries, routing protocols are used to advertise routes through the network. That is, a first router peers with a second router and sends messages to the second router indicating which addresses it can reach through its other interfaces and how far away those addresses are. The first router also receives corresponding information from the second router, and uses this information to determine how to route packets.

In logical networks implemented in a datacenter, user-defined data compute nodes (e.g., virtual machines) on different subnets may need to communicate with each other, as well as with machines external to the datacenter. In this case, tenants may define a network for virtualization that includes both logical switches and logical routers. Methods for implementing the logical routers to adequately serve such virtualized logical networks in datacenters are needed, including methods that allow for a similar route exchange with routers of the external physical network.

BRIEF SUMMARY

Some embodiments provide a method for implementing one or more dynamic routing protocols (e.g., BGP, OSPF, etc.) for a logical router that interfaces with an external network (e.g., external to the datacenter in which the logical router is implemented). In some embodiments, the logical router has multiple interfaces with the external network, which are implemented by multiple centralized routing components operating in separate gateway host machines (the logical router may also have a distributed routing component, implemented on all of the gateway host machines as well as other host machines). Each interface may be assigned to a separate centralized routing component in some embodiments, while other embodiments allow multiple interfaces per centralized routing component. Each of the interfaces connects to at least one external subnet in some embodiments, and the centralized routing components are each physically connected to at least one external physical router in the external subnet.

In some embodiments, each of the gateway host machines includes the centralized routing component, a local controller, and a routing protocol application. In some embodiments, the centralized routing component is implemented as a separate data compute node (e.g., virtual machine, container, etc.), in which case the gateway host machine also includes a managed forwarding element that performs additional logical processing on packets sent to and from the centralized routing component. In other embodiments, the centralized routing component is implemented within the datapath of the MFE (e.g., in a datapath development kit (DPDK) based MFE).

Though referred to herein as an application, the routing protocol application may be an application, a daemon operating in the background, a kernel layer process, etc. in different embodiments. While each of the gateway host machines includes a routing protocol application, in some such embodiments only one of these is designated as an active routing protocol application, which implements the dynamic routing protocols for all of the centralized routing components of the logical router. The other routing protocol applications act as standbys, in case the active routing protocol application fails. When external physical routers send routing protocol packets to these standby routing protocol applications, the datapaths on their gateway host machines forward the packets to the correct gateway host machine (with the master routing protocol application).

The local controller on each of the host machines communicates with a centralized network controller to receive configuration information for configuring (i) the MFE on the host machine, (ii) the centralized routing component (which, as mentioned, may be implemented within the datapath of the MFE), and (iii) the routing protocol application. The local controller of some embodiments translates this data into formats readable by these components and uses the translated data to configure the components.

In addition, the local controller on the host machine with the master routing protocol application is responsible for distributing a routing table (e.g., forwarding information base, or FIB) calculated by the routing protocol application based on the routing protocol packets received from the external physical routers. When the different centralized routing components connect to different external subnets, only some of the routes may be useful for them. Thus, the local controller stores information indicating the subnets to which each of the other centralized routing components connects. For each route in the routing table from the master routing protocol application, the local controller identifies the centralized routing components that connect to the subnet to which the next hop of the route corresponds, and only distributes the route to the local controller managing that centralized routing component.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments provide a method for implementing one or more dynamic routing protocols (e.g., BGP, OSPF, etc.) for a logical router that interfaces with an external network (e.g., external to the datacenter in which the logical router is implemented). In some embodiments, the logical router has multiple interfaces with the external network, which are implemented by multiple centralized routing components operating in separate gateway host machines (the logical router may also have a distributed routing component, implemented on all of the gateway host machines as well as other host machines). Each interface may be assigned to a separate centralized routing component in some embodiments, while other embodiments allow multiple interfaces per centralized routing component. Each of the interfaces connects to at least one external subnet in some embodiments, and the centralized routing components are each physically connected to at least one external physical router in the external subnet.

Figure 1:
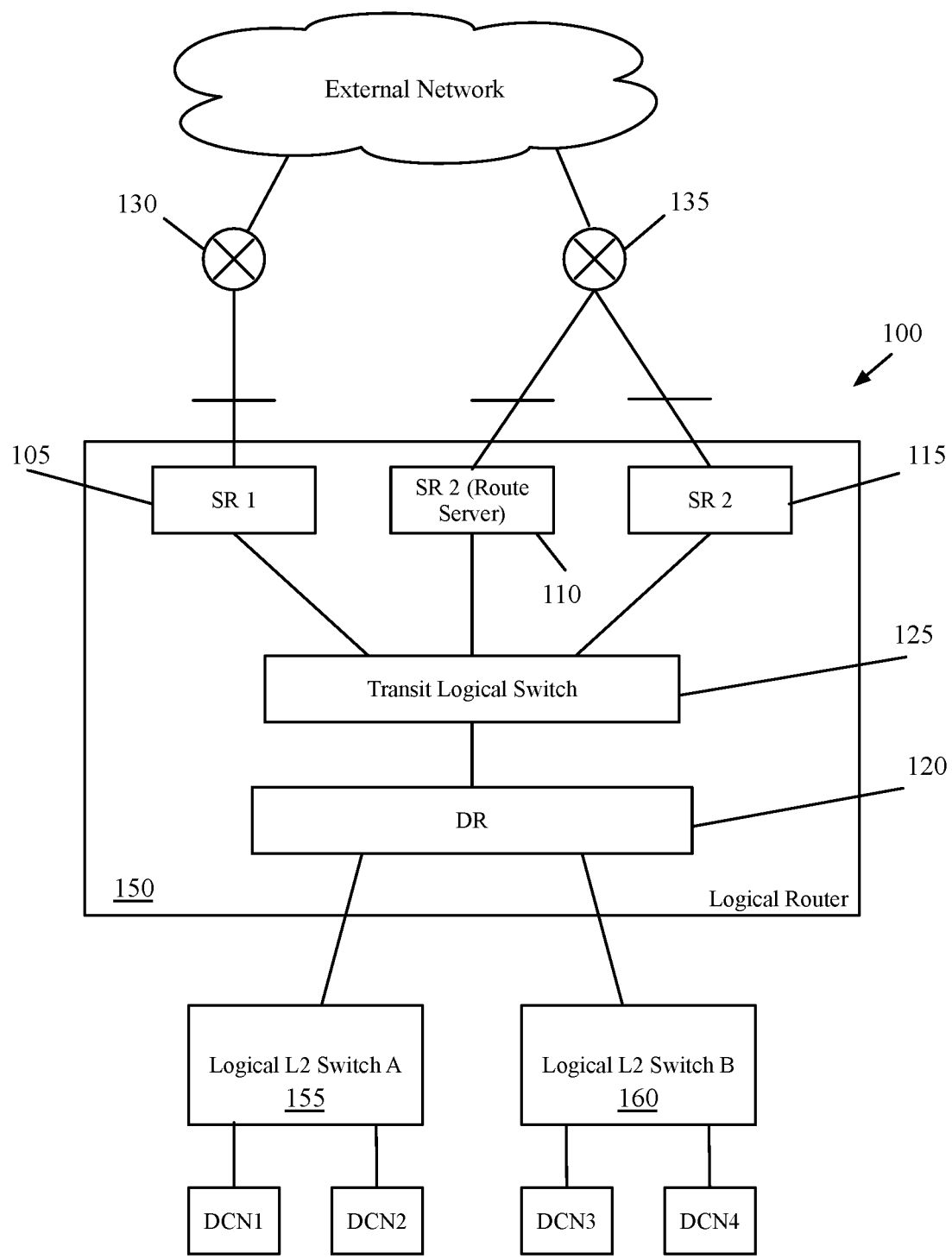
FIG. 1 conceptually illustrates a logical view of a logical network, which includes multiple routing components for a logical router.

FIG. 1 conceptually illustrates a logical view 100 of a logical network 100, which includes multiple routing components for a logical router 150. As shown, the logical network 100 includes this logical router 150 as well as two logical switches 155 and 160. Each of the logical switches 155 and 160 have logical ports to which data compute nodes (DCNs) attach. These DCNs may be virtual machines (VMs), containers, physical machines, etc.

In some embodiments, when a user configures the logical network, the user inputs a logical router and assigns one or more interfaces to the logical router. The management plane then defines multiple logical routing components for the logical router, if need be, as well as a transit logical switch to connect them. As shown in FIG. 1, the network controller has created three centralized routing components, also referred to as service routers (SRs), 105-115 for the logical router 150, as well as a distributed router (DR) 120 and a transit logical switch 125. The DR 120 includes a southbound interface for each of the logical switches 155 and 160, and a single northbound interface to the transit logical switch 125 (and through this to the SRs). The SRs 105-115 each include a single southbound interface to the transit logical switch 120 (used to communicate with the DR 120, as well as each other in certain situations). Each SR 105-115 also corresponds to one or more uplink interfaces of the logical router, which connects to a network external to the logical network. In this case, each of the SRs 105-115 is assigned a single interface, which may be on the same or different external subnets, and thus connect to either the same set of external routers or different sets of routers, in different circumstances. In this case, the interface assigned to the first SR 105 is on a first subnet 10.1.1.0/24 and connects to a first external router 130, while the second and third interfaces assigned to SRs 110 and 115 are on a second subnet 20.1.1.0/24 and both connect to a second external router 135.

The detailed configuration of the northbound and southbound interfaces of the various routing components 105-120 and their connections with the transit logical switch 125 are described in detail in U.S. Pat. No. 10,230,629, which is incorporated herein by reference. In some embodiments, the management plane generates separate routing information bases (RIBs) for each of the router constructs 105-120. That is, in addition to having separate objects created in the management/control plane, each of the router constructs 105-120 is treated as a separate router with a separate routing table. Some embodiments define a subnet for the transit logical switch from a pool of available subnets for internal use, and define the internal interfaces of the router constructs 105-120 as having IP addresses in that subnet. In addition, the management plane assigns MAC addresses to each of the internal interfaces. The RIB for the DR 120 of some embodiments is defined with a default route pointing to any of the three southbound interfaces of the SRs 105-115 (which the implementation would choose among using equal-cost multi-path (ECMP) principles). In addition, the user would typically configure a static default route for the logical router pointing to the external routers 130 and 135, which would be automatically added to the RIBs for each of the three SRs 105-115.

Figure 2:
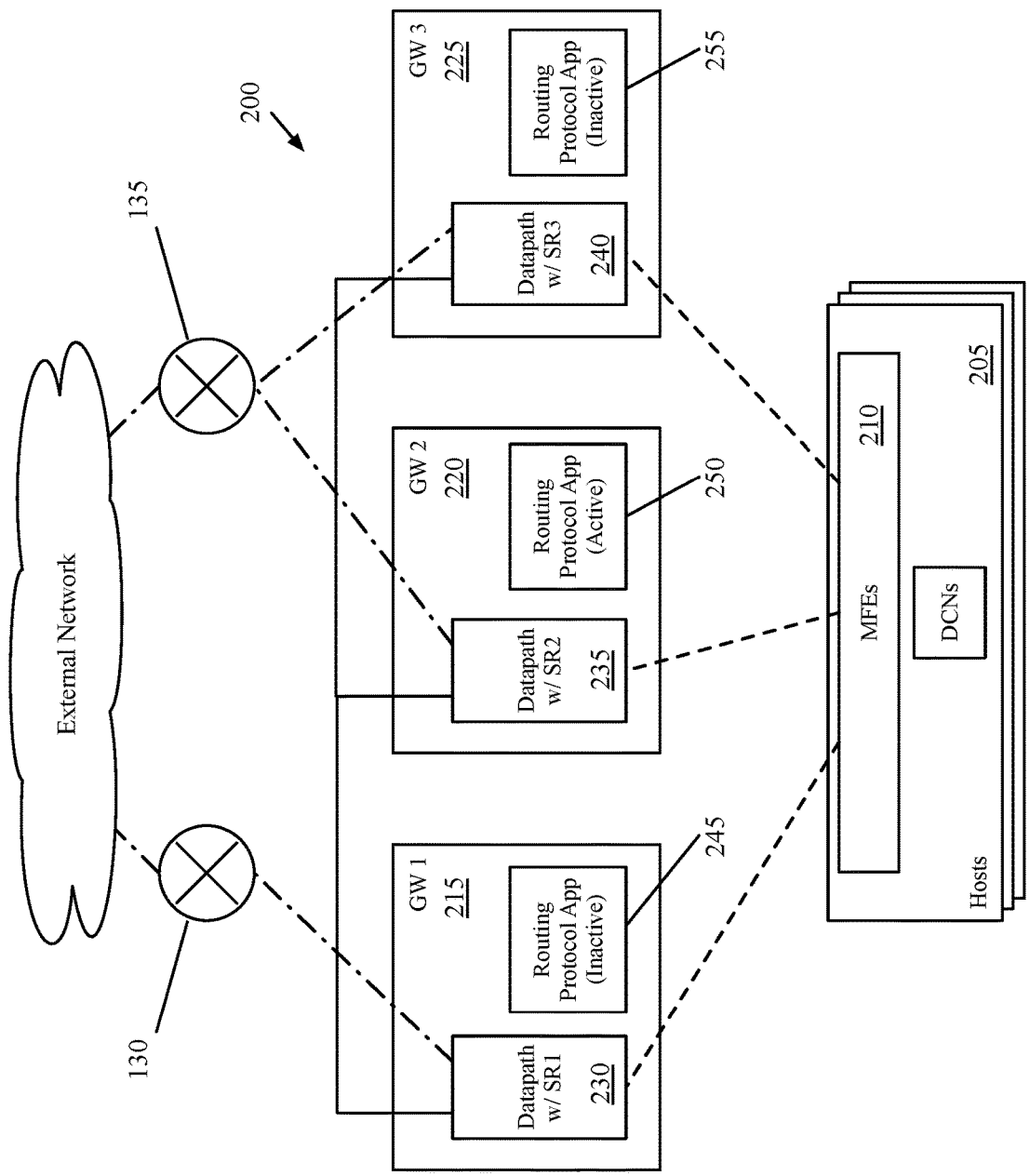
FIG. 2 illustrates a physical implementation of the logical network of FIG. 1, specifically focusing on the logical router.

FIG. 2 illustrates a physical implementation 200 of the logical network 100, specifically focusing on the logical router 150. As shown, the DCNs of the logical network operate on one or more host machines 205, on which managed forwarding elements 210 operate. The DCNs may all operate on the same host machine or be distributed across multiple such host machines.

Managed forwarding elements (MFEs) 210 also operate on these host machines 205, in order to implement the distributed aspects of the logical network 100. These MFEs 210, in some embodiments, are software virtual switches (e.g., Open vSwitch (OVS), ESX) that operate within the hypervisors or other virtualization software on the host machines. Though the MFEs are software virtual switches, they may be referred to as physical forwarding elements in order to differentiate them from the logical forwarding elements 150-160, which are abstract elements defined as a network configuration, and which are implemented on the physical forwarding elements. These MFEs 210 perform first-hop switching and routing on packets sent by the DCNs to implement the logical switches 155 and 160 and the DR 120. The MFEs 210 (or a subset of them) also may implement logical switches (and distributed logical routers) for other logical networks if the other logical networks have DCNs that reside on the host machines 205 as well.

The three SRs 105-115 each operate on different gateway machines 215-225. The gateway machines 215-225 are host machines similar to the machines 205 in some embodiments (e.g., x86 boxes), but host SRs rather than user DCNs. In some embodiments, the gateway machines 215-225 operate MFEs similar to the MFEs 210. In some such embodiments, the SR operates as a separate data compute node (e.g., in a VM, namespace, etc.), to which the MFE on the gateway machine sends packets (and from which the MFE receives packets after processing). In other embodiments, however, the SR is implemented within the MFE datapath (e.g., in a datapath development kit (DPDK) based MFE), as shown in this case. Specifically, the datapath 230 of the MFE on the first gateway host 215 is configured to implement the first SR 105, the datapath 235 of the MFE on the second gateway host 220 is configured to implement the second SR 110, and the datapath 240 of the MFE on the third gateway host 225 is configured to implement the third SR 125.

The MFEs on the gateways 215-225, like the MFEs 210 on the user DCN hosts, implement the distributed aspects of the logical network 100, including the logical switches 155 and 160, the DR 120, and transit logical switch 125. For instance, packets sent from the external network may be routed by the SR routing table on one of the gateway machines and then subsequently switched and routed (according to the DR routing table) by the MFE on the same gateway. In addition, the MFE provides the connections to the physical NICs on the gateway machines 215-225, for both internal connections (e.g., tunneling to other MFEs) as well as connections to external routers, as shown in more detail below by reference to FIG. 3. Each of the MFEs on the gateway machines 215-225 connects to one of the external routers 130 (in the case of the gateway machine 215) and 135 (in the case of the gateway machines 220 and 225). For differentiation purposes in this figure, tunnels between the edge MFEs 210 (that connect directly to the user DCNs) and gateway MFEs (that implement the SRs) are shown as straight dotted lines, while tunnels between the gateway MFEs are shown as orthogonal solid lines. In addition, the connections from the gateway MFEs to the external routers 130 and 135 are shown as straight dashed/dotted lines.

As shown, each of the gateway host machines 215-225 also operates a routing protocol application 245-255. Though referred to herein as an application, the routing protocol applications 245-255 may be applications, daemons operating in the background, kernel layer processes, etc. in different embodiments. In some embodiments only one of the routing protocol applications is designated as an active routing protocol application (in this case, the second application 250, corresponding to the second SR). The active routing protocol application 250 implements the dynamic routing protocols (e.g., BGP, OSPF, etc.) for all of the centralized routing components of the logical router. The other routing protocol applications 245 and 255 act as standbys, in case the active routing protocol application fails. When external physical routers send routing protocol packets to these standby routing protocol applications, the datapaths on their gateway host machines forward the packets to the correct gateway host machine (with the master routing protocol application). In some embodiments, local controllers operating on the gateway hosts use various deterministic criteria (so that they will all come to the same conclusion) to select one of the routing protocol applications 245-255 as the active application. For instance, in some embodiments the administrator that configures the logical network ranks the SRs, and this ranking is used to select an active routing protocol application. Other embodiments use other selection techniques (e.g., a deterministic hash algorithm, etc.).

The active routing protocol application 250 operates one or more control planes for routing protocols such as Border Gateway Protocol (BGP), Open Shortest Path First (OSPF), or others. As with the datapaths 230-240 implementing SRs (and other logical forwarding elements) for multiple logical networks, the routing protocol applications may operate the routing protocol control planes for multiple logical routers of multiple logical networks in some embodiments. For instance, the routing protocol applications 245 and 255, which are inactive (standby) with respect to the logical router 150, might be actively operating routing protocol control planes for other logical routers. In other embodiments, separate routing protocol application instances are instantiated on the gateways for other logical routers (e.g., each instance of the application, daemon, process, etc. operates a control plane for one logical router).

The active routing protocol application of some embodiments receives (i) routing protocol data from the external router(s) to which its local SR connects and (ii) routing protocol data from the other SRs that those SRs have received from their external router connections. The northbound ports of the two external routers 130 and 135 might be connected to different subnets, and have completely different sets of routes (or similar routes, depending on the configuration). In addition, the active application generates routing protocol packets (e.g., to advertise routes for public IP addresses and subnets of the logical network) and sends these packets to the external router(s) to which its local SR connects. For example, the SRs 105-115 might advertise the subnets of logical switch 155 and/or logical switch 160, depending on whether these addresses are public.

In some embodiments, the active application also generates routing protocol packets for the other SRs, which are tunneled to these other SRs and sent out by them to their respective connected external routers. In other embodiments, each routing protocol application (including the inactive applications) generates its own routing protocol packets for advertising routes, but still forwards received packets to the single active application acting as the route server.

In the example shown in FIGS. 1 and 2, the logical router that connects to the external network also connects directly to the logical switches. In some embodiments, two tiers of logical routers are defined within a logical network. Provider logical routers (PLRs) provide a connection between the logical network implemented in a datacenter and the external network, and are often administered by the owner of the datacenter. Multiple tenant logical routers (TLRs) may connect to the southbound interfaces of PLRs, allowing different tenants of a datacenter to configure their own logical routers (and logical switches). In the two-tiered case of some embodiments, the PLRs implement the routing protocols in the manner described herein, in order to exchange routes with the external network. In some such cases, the logical switches that connect to the TLRs may be public subnets, and the PLR advertises routes for these logical switch subnets. The two tiers of logical routers are described in further detail in U.S. Patent Publication 2015/0271303, which is incorporated by reference herein.

In some embodiments, local network controllers operate on each of the gateway host machines, for the purpose of communicating with a centralized network controller to receive configuration information for configuring (i) the MFE on the host machine, (ii) the centralized routing component (which, as mentioned, may be implemented within the datapath of the MFE), and (iii) the routing protocol application. The local controller of some embodiments translates this data into formats readable by these components and uses the translated data to configure the components.

Figure 3:
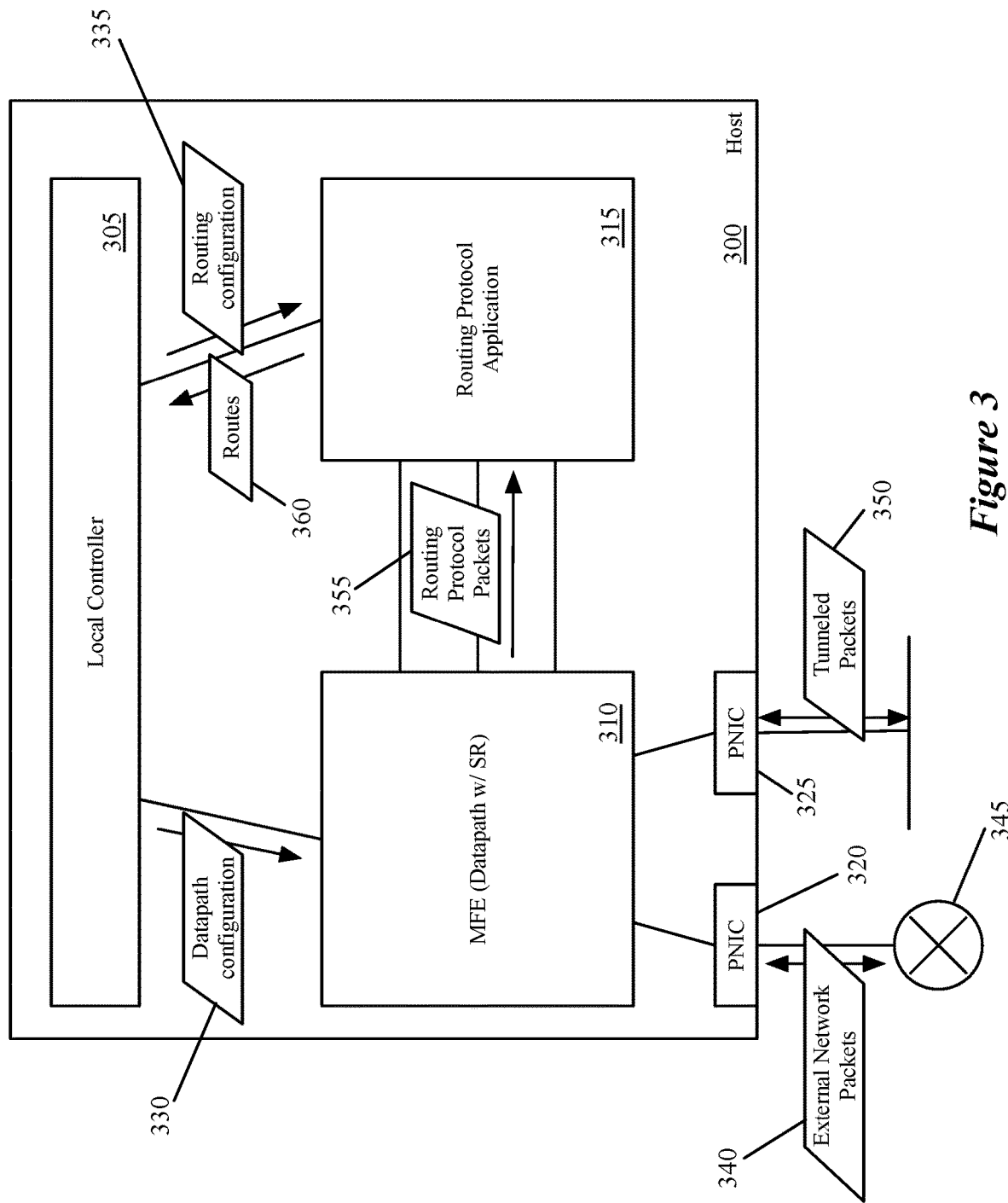
FIG. 3 conceptually illustrates the architecture of a gateway host machine of some embodiments on which a routing protocol application operates.

FIG. 3 conceptually illustrates the architecture of a gateway host machine 300 of some embodiments on which a routing protocol application operates. Specifically, the gateway host machine includes a local controller 305, a MFE 310, and a routing protocol application 315. The host machine 300 also includes two physical network interface controllers (PNICs) 320 and 325, though some hosts may have fewer (i.e., one) or more (e.g., if the SRs implemented on the host machine connect to different external subnets).

As mentioned, the local controller 305 receives configuration information for both the MFE 310 and the routing protocol application 315. In some embodiments, this configuration information is received from a set of central network controllers (not shown) as a set of abstract data tuples, and converted into data formatted for the MFE 315 and routing protocol application 315. For instance, when an administrator configures a logical network, the management plane of some embodiments generates data tuples describing the logical network (e.g., the logical forwarding elements, logical ports of those forwarding elements, etc.), and a central controller (or cluster of central controllers) passes these generated data tuples to the appropriate local controllers (those operating on host machines that require the configuration).

In this case, the local controller 305 provides datapath configuration data 330 to the MFE 310, enabling the MFE to implement the logical forwarding elements of one or more logical networks, including an SR of a logical router. This datapath configuration data 330 may be provided in the form of flow entries for a flow-based MFE (e.g., OVS), configuration rules, etc. In some embodiments, the MFE 310 is a DPDK-based datapath that operates in the userspace of a hypervisor in the host machine 300. The local controller also provides routing configuration data 335 to the routing protocol application 315. This configuration data 335, in some embodiments, includes the routes to advertise, the SRs for which the application 315 advertises routes, etc.

In some embodiments, as mentioned, the MFE 310 is a DPDK-based datapath that includes configuration for the SR. The datapath operates to process a packet by retrieving rules for logical forwarding elements (e.g., the logical switches, DR, and SR) from a configuration rules database, and matching the packet against these rules. The configuration rules matched by a packet for a particular logical forwarding element may specify to drop the packet, logically send the packet to a logical port of another logical forwarding element (in which case the rules for that logical forwarding element are retrieved from the configuration database), modify the packet (e.g., by encapsulating the packet in a tunnel, routing the packet, etc.), output the packet to one or the other of PNICs 320 and 325, etc.

As shown, the MFE 310 receives packets from and sends packets to the PNICs 320 and 325. The first PNIC 320 allows the MFE to exchange traffic 340 with an external router 345. These packets may include data traffic sent between the DCNs of the logical network located behind the gateway and external machines. In addition, the external router 345 sends routing protocol packets (e.g., BGP and/or OSPF packets) to the routing protocol application 310 via this interface, and similarly such packets generated by the application 315 are sent to the external router 345 via the interface. The PNIC 325 allows the MFE 310 to exchange traffic 350 with other MFEs through tunnels between the MFEs. This traffic 350 may also include both data traffic (e.g., sending packets to and receiving packets from the user DCNs of the logical network) as well as routing protocol packets. For instance, if one of the SRs with a standby routing protocol application receives a routing protocol packet from an external router, that SR encapsulates the packet and sends it to the SR with the active routing protocol application. In some embodiments, the tunnel encapsulation includes context information indicating that it is a routing protocol packet, so that the MFE 310 can send the packet to the routing protocol application 315.

The routing protocol application 315, in some embodiments, is configured to act as a control plane for all of the SRs of a logical router (assuming it is the active application for that logical router). In some embodiments, the application includes multiple interfaces with the MFE 310, with each interface corresponding to a particular one of the SRs. In this case, there are three interfaces because the logical router in question includes three SRs (including the SR implemented by the MFE 310). The MFE 310 forwards the routing protocol packets 355 received from the external router 345 and via tunnels from the other SRs to the application 315 via the appropriate interface. In some embodiments, the MFE 310 and routing protocol application 315 both operate in userspace, but pass the routing protocol packets through the kernel. For instance, some embodiments use a userspace kernel transport, such as a kernel NIC interface (KNI), to transfer the packets between the two processes.

The routing protocol application 315 receives the routes via the routing protocol packets and performs routing protocol operations to calculate a routing table, or forwarding information base (i.e., a set of routes for the logical router). For example, a first external router might advertise to one of the SRs that it reaches a particular subnet with an administrative distance of X, while a second external router advertises to a different SR that it reaches the particular subnet with an administrative distance of 4X. In this case, the routing protocol application 315 identifies that the route with a distance X should be part of the routing table and discards the other route. The routing protocol application 315 provides these routes 360 to the local controller 305.

The local controller 305 is responsible for distributing the routing table calculated by the routing protocol application 315. However, when the different SRs connect to different external subnets, different subsets of the routes may be useful for each of the SRs. Thus, the local controller 305 stores information indicating the subnets to which each of the other SRs connect. For each route in the routing table from the master routing protocol application 315, the local controller 305 identifies the SRs that connect to the subnet to which the next hop of the route corresponds, and only distributes the route to the local controller managing that SR.

These routes may be distributed via the central controller cluster in some embodiments, or directly through a connection between the local controllers in other embodiments.

Figure 4:
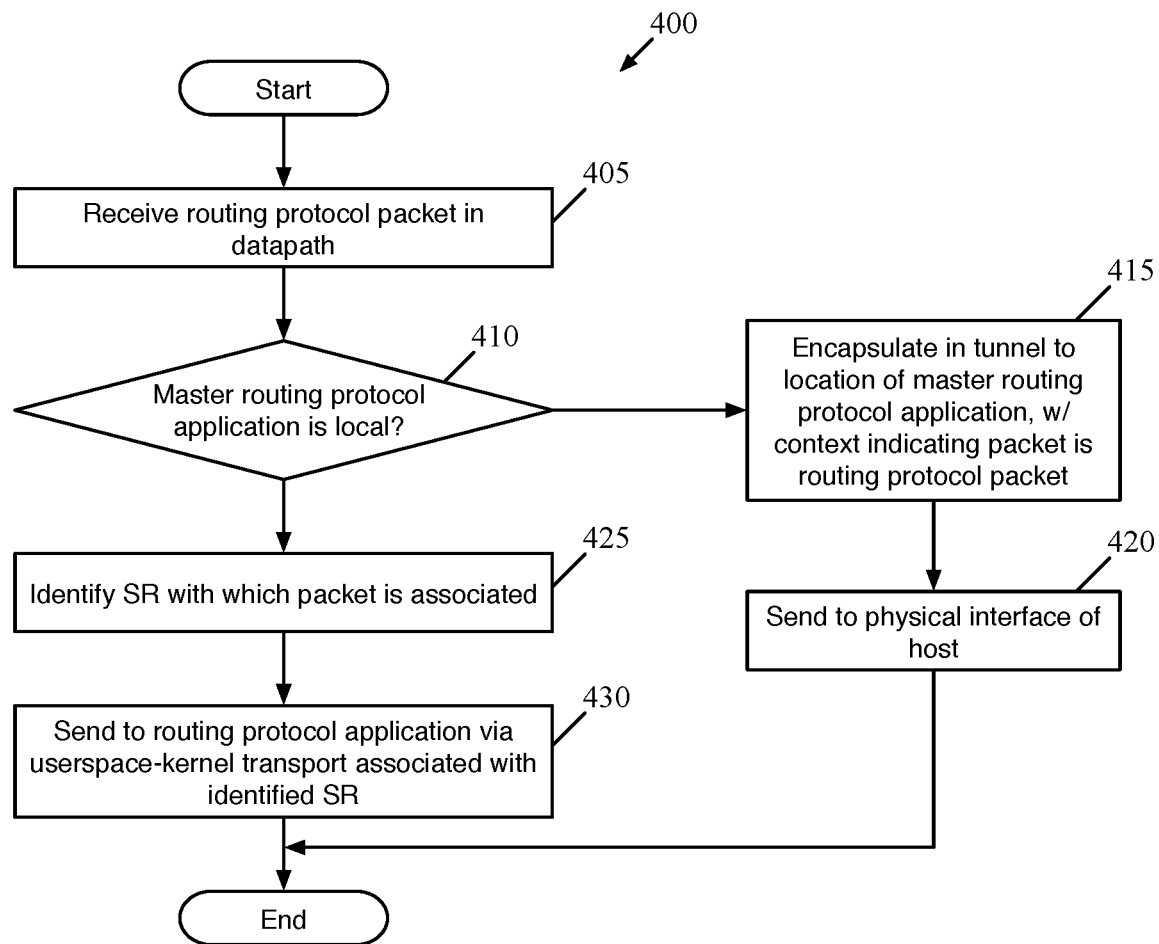
FIG. 4 conceptually illustrates a process of some embodiments for processing routing protocol packets in the MFE datapath.

As mentioned, in some embodiments each of the MFEs that implements an SR may receive routing protocol packets from the external routers to which its SR connects. FIG. 4 conceptually illustrates a process 400 of some embodiments for processing routing protocol packets in the MFE datapath. This process refers to the operation of a DPDK-based MFE datapath, but similar operations could be performed by a flow-based MFE, a code-based MFE such as an ESX hypervisor, etc.

As shown, the process begins by receiving (at 405) a routing protocol packet in the datapath. In some embodiments, the MFEs that implement SRs with connections to external routers are configured (e.g., by their respective local controllers) to perform initial processing to determine whether a packet is a routing protocol packet, so that it can be sent to the active routing protocol application with minimal or no additional processing. When standard data packets are received, the MFE of some embodiments performs the operations of various logical forwarding elements on these packets, which are not required (or desired) for routing protocol packets meant for consumption by the routing protocol application. Some embodiments identify, for example, BGP packets on TCP port 179, while OSPF unicast packets are identified as IP packets with a protocol value of 89. In addition, OSPF uses addresses 224.0.0.5 and 224.0.0.6 for multicast packets in some embodiments.

For packets received from an external router, some embodiments identify the packet as a routing protocol packet based on analysis of the header to identify the routing protocol (e.g., BGP, OSPF, etc.). However, packets that have been sent to a gateway with the master routing protocol application from a gateway with the standby application will be tunneled. As described below by reference to operation 415, some embodiments include context information in the tunnel header to identify the packet as a routing protocol packet.

Upon receiving a routing protocol packet, the process 400 determines (at 410) whether the master routing protocol application for the SR to which the packet is local (i.e., whether the master is located at the current gateway). In some embodiments, the routing protocol packet is sent to a particular IP address (the northbound interface of the SR), and this IP address enables the MFE to identify the logical router for which the packet is intended (if multiple SRs are implemented by the MFE). The MFE is also configured with the location of the active routing protocol application for the logical router, which could be local or on the gateway machine hosting a different SR.

When the master routing protocol application is not local, the process encapsulates (at 415) the packet in a tunnel to the location of the master routing protocol application. In some embodiments, this tunnel header includes context information indicating that the packet is a routing protocol packet. As noted above, some embodiments use overlay network tunnels (e.g., STT, GRE, etc.) to send logical network packets between MFEs. This encapsulation uses IP addresses assigned to the sending and receiving MFEs (e.g., of PNICs of their respective gateway hosts) to send packets through the datacenter. The tunnel header, in some embodiments, also allows for certain context information to be embedded (e.g., to indicate logical network processing results for data packets, etc.). Some embodiments use this context information to indicate that a packet should be sent to the routing protocol application. The process then sends (at 420) the packet to the physical interface of the gateway host machine that is used for internal tunnel traffic (e.g., the PNIC 325 of FIG. 3), and ends.

On the other hand, when the master routing protocol application is located locally on the gateway host machine with the SR performing process 300, the process identifies (at 325) the SR with which the packet is associated. The process then sends (at 330) the packet to the routing protocol application via a userspace-kernel transport associated with the identified SR, and ends. The SR can be identified based on the source of the packet, in some embodiments, as well as by the address to which the packet is sent. For instance, packets received directly from an external router at the gateway host machine will generally be associated with the local SR, and sent to the IP address used by the local (master) routing protocol application. Packets received through a tunnel are associated with the SR to which the packet was originally sent, which can be identified by the source address in the tunnel header (which identifies the gateway host machine) as well as the internal destination of the routing protocol packet itself.

As described above, in some embodiments the MFE passes routing protocol packets to the routing protocol application via userspace-kernel transports, such as KNIs or TUN/TAP virtual network kernel devices. The MFE datapath creates one KNI (or other transport mechanism) per SR, and forwards the routing protocol packets to the routing protocol application via the correct KNI based on SR to which the packet was originally sent. The user of multiple interfaces allows the routing protocol application to easily identify the SR to which the packet was originally sent, and for packets with multiple IP addresses to be sent to different interfaces.

The routing protocol application uses the routes advertised by the external routers via these routing protocol packets to calculate routes for all of the SRs. In some embodiments, the active routing protocol application does not need to operate with an understanding of the separation of the various SRs, and instead calculates the routes as though the logical router is a single router entity and provides these routes to the local controller. In different embodiments, the local network controllers may use different techniques to compute the routes for use by the SRs. Some embodiments perform all of the calculations on the local controller that manages the master routing protocol application, while in other embodiments each local controller performs separate calculations to determine the routing table for its local SR (also referred to as proxy installation).

Figure 5:
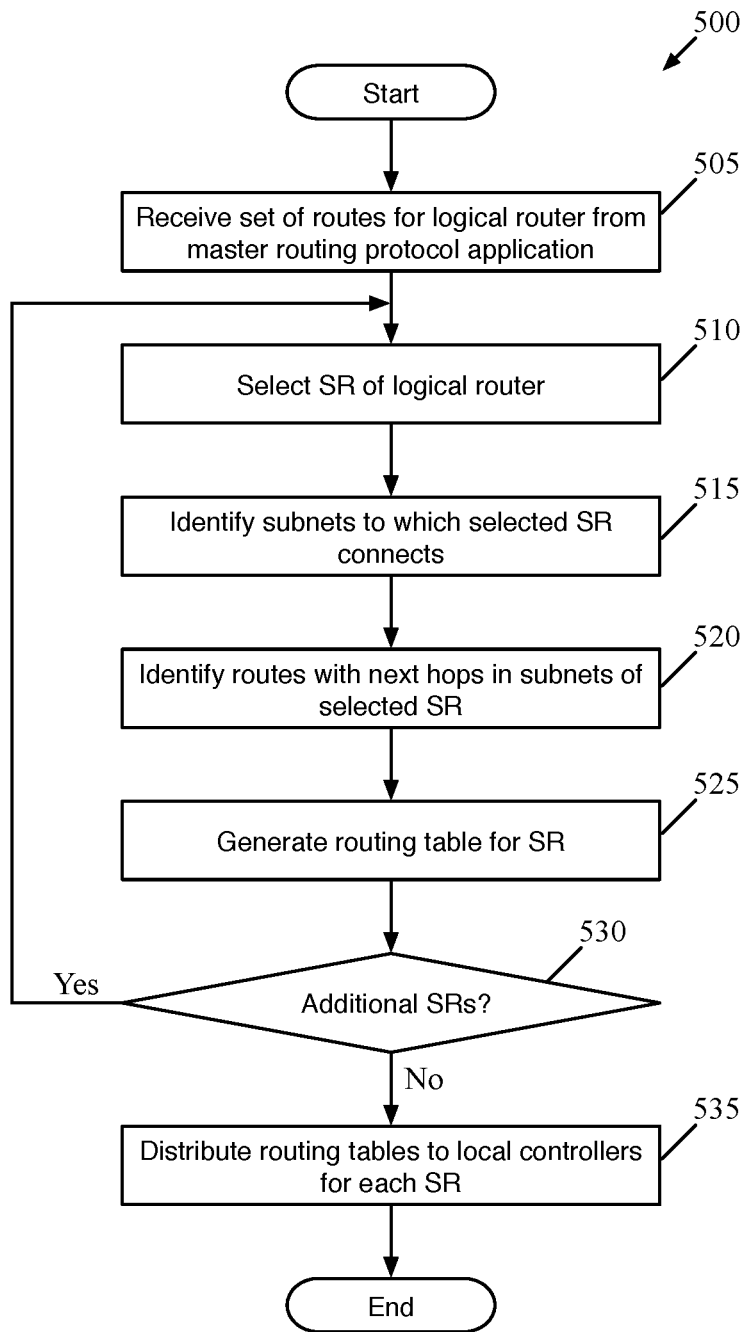
FIG. 5 conceptually illustrates a process of some embodiments for installing routes calculated by a routing protocol application for use by the SRs, when the installation is performed by a local network controller operating at the gateway host with the master routing protocol application.
Figure 6:
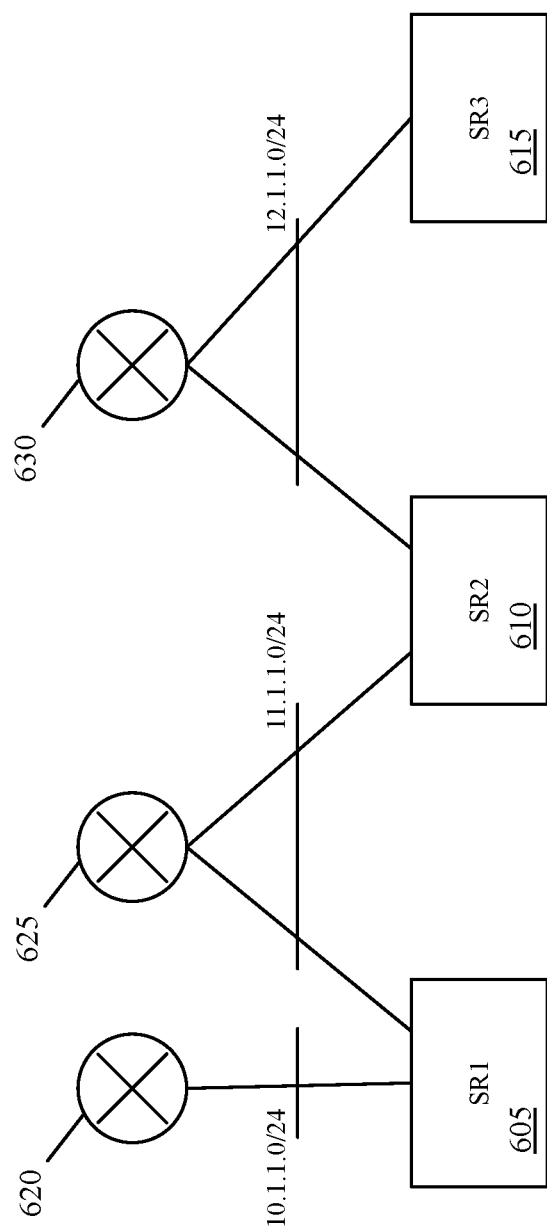
FIG. 6 conceptually illustrates three SRs of a logical router and their connections to external routers.

FIG. 5 conceptually illustrates a process 500 of some embodiments for installing the routes calculated by the routing protocol application for use by the SRs, when the installation is performed by the local network controller operating at the gateway host with the master routing protocol application, to install routes both on its local MFE as well as the other MFEs that implement other SRs of the same logical router. This process 500 will be described in part by reference to FIGS. 6 and 7. FIG. 6 conceptually illustrates three SRs of a logical router and their connections to external routers, while FIG. 7 conceptually illustrates the individualization of routing tables for these SRs by a local controller 700.

As shown, the process 500 begins by receiving (at 505) a set of routes from the master routing protocol application, located locally on the host. This master routing protocol application receives the routes via routing protocol packets as described above, and calculates an overall routing table (FIB) for the logical router. This overall routing table is provided to the local controller.

As mentioned, FIG. 6 conceptually illustrates an example of three SRs 605-615 that operate as gateways for a logical router. In this case, the first SR 605 has two northbound interfaces, connected to external router 620 via subnet 10.1.1.0/24 and external router 625 via subnet 11.1.1.0/24. The second SR 610 also has two northbound interfaces, connected to external router 625 via subnet 11.1.1.0/24 and external router 630 via subnet 12.0.0.0/24. Lastly, the third SR 615 has only one northbound interface, which is also connected to the external router 630 via subnet 12.1.1.0/24.

Figure 7:
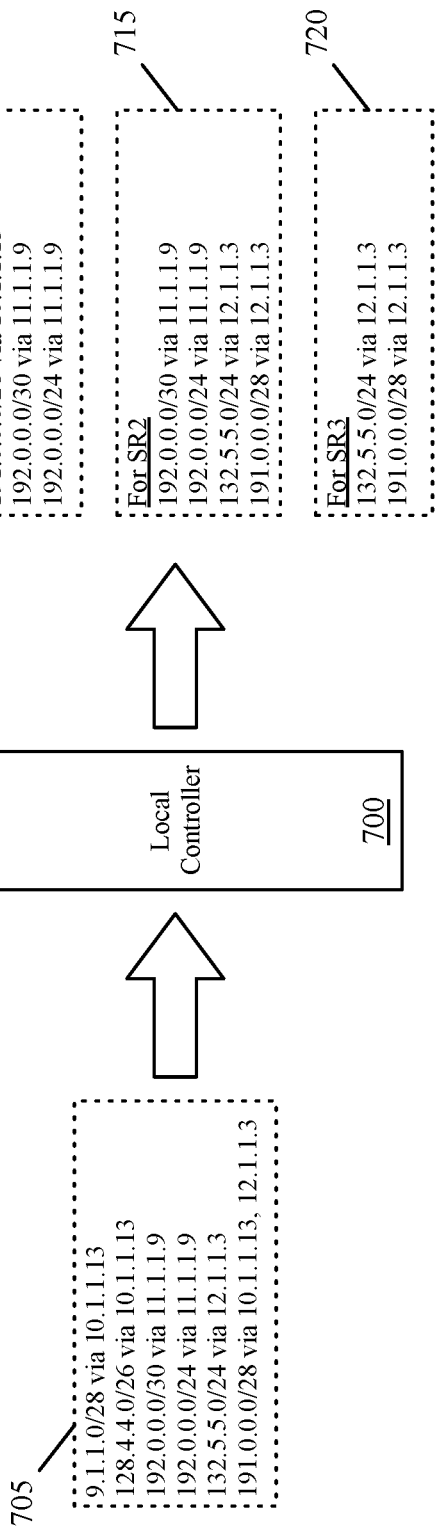
FIG. 7 conceptually illustrates the individualization of routing tables for the SRs of FIG. 6 by a local controller.

FIG. 7 illustrates a routing table (FIB) 705 calculated by the master routing protocol application operating on the same gateway as one of the SRs 605-615. This routing table includes six routes (which is much smaller than would be expected in a typical deployment), which are learned based on routing protocol packets sent from the external routers 620-630 to the SRs 605-615. These include two routes (9.1.1.0/28 and 128.4.4.0/26) with a next hop address of 10.1.1.13, two routes (192.0.0.0/30 and 192.0.0.0/24 with a next hop address of 11.1.1.9, and one route (132.5.5.0/24) with a next hop address of 12.1.1.3. The routing table also includes an ECMP route (191.0.0.0/28) with possible next hop addresses of 10.1.1.13 and 12.1.1.13.

Returning to FIG. 5, the process 500 uses the received routing table to compute a separate routing table for each SR. As shown, the process selects (at 510) one of the SRs of the logical router. While the process 500 illustrated in this figure iterates over the SRs of the logical router, it should be understood that this is a conceptual process. Other embodiments might iterate over each route in the routing table, or perform operations for multiple SRs or multiple routes in parallel.

The process 500 identifies (at 515) the subnets to which the selected SR connects. This information is known to the local controller as part of the logical network configuration data received by the local controller. Specifically, in some embodiments, each local controller knows the interfaces that are assigned to each SR, and the connectivity information for those interfaces. As such, the subnets for each SR are based on the aggregate connectivity of the interfaces for the SR. In the example of FIG. 6, the first SR 605 connects to subnets 10.1.1.0/24 and 11.1.1.0/24, the second SR 610 connects to subnets 11.1.1.0/24 and 12.1.1.0/24, and the third SR 615 connects to only the one subnet 12.1.1.0/24.

Next, the process identifies (at 520) the routes with next hops in the subnets of the selected SR, and generates (at 525) a routing table for the SR that includes these routes. That is, the local controller generates a routing table for each SR that includes only the routes with next hops that make sense for the SR. In some embodiments, when the received routing table includes ECMP routes with multiple next hops, only those next hops that are on subnets to which the SR has a connecting interface are included. With the routing table generated for the currently selected SR, the process determines (at 530) whether additional SRs remain for which the process needs to generate the routing table. If additional SRs remain, the process returns to 510 to select the next SR and generate its routing table as well.

FIG. 7 illustrates three output routing tables 710-720 for the SRs 605-615 respectively, as computed by the local controller 700. As shown, the routing table 710 for the first SR 605 includes both of the routes with next hop address 10.1.1.13 and both of the routes with next hop address 11.1.1.9. In addition, the controller 700 includes the route for 191.0.0.0/28 in this routing table, but with only a single next hop address 11.1.1.9. Because the next hop address 12.1.1.3 is not on either of the subnets of the SR 605, this second equal-cost option is not included in the routing table for that SR. The routing table 715 for the second SR 610 includes both of the routes with next hop address 11.1.1.9 and the route with next hop address 12.1.1.3. In addition, the route for 191.0.0.0/28 is also included, but with a next hop of 12.1.1.3 rather than 10.1.1.13. Lastly, the routing table 720 for the third SR 615 includes only two routes, the one route with a next hop address 12.1.1.3 and the ECMP route for 191.0.0.0/28, again using only the next hop address of 12.1.1.3. While in this example none of the routes in the individual routing tables for the SRs include ECMP routes, if the original routing table included a route with next hops 10.1.1.13 and 11.1.1.9, this route would be used with both possible next hops in the routing table for the first SR 605.

After generating all of the individual SR routing tables, the process 500 distributes (at 535) the routing tables to the local controllers for each SR. This includes using the routing table for the local SR to configure the MFE implementing that SR (or configuring the separate data compute node implementing the SR, if this is separate from the MFE's datapath). In addition, the routing table entries for each other SR are distributed (e.g., via a central controller) to the respective local controller that manages the other SR, so that these local controllers can configure their SRs with the respective routes. In addition, some embodiments provide the full routing table to the central controller so that it can use this to add routes to the DR routing table, which allows the MFEs implementing the DR to send packets to the appropriate SR (e.g., in the example, sending packets with a destination IP address of 9.1.1.5 to the first SR 605 based on the route for 9.1.1.0/28).

Figure 8:
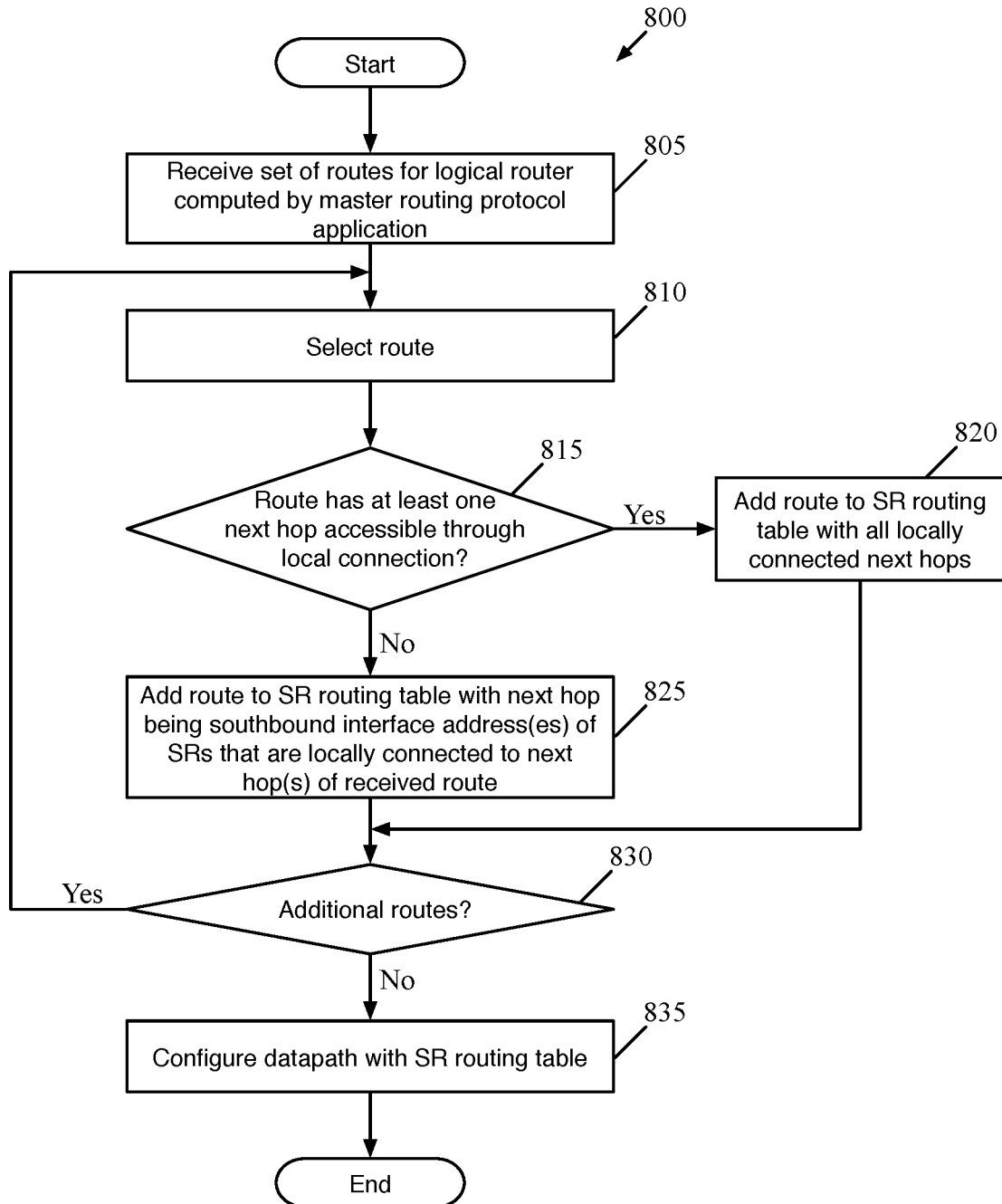
FIG. 8 conceptually illustrates a process of some embodiments for installing routes calculated by a routing protocol application for use by the SRs, when the installation is performed separately by each local network controller for the SR operating on its gateway host.

FIG. 8 conceptually illustrates a process 800 of some embodiments for installing the routes calculated by the routing protocol application for use by the SRs, when the installation is performed separately by each local network controller for the SR operating on its gateway host (as opposed to the above-described process 500, in which the local controller for the active application calculates the routing tables for all of the SRs). This process 800 will be described in part by reference to FIGS. 6 and 9. FIG. 6, described above, conceptually illustrates three SRs of a logical router and their connections to external routers, while FIG. 9 conceptually illustrates the individualization of routing tables for these SRs by three separate local controllers 905-915.

As shown, the process 800 begins by receiving (at 805) a set of routes computed by the master routing protocol application for a logical router, which may be located locally on the host or at a different host. This master routing protocol application receives the routes via routing protocol packets as described above, and calculates an overall routing table (FIB) for the logical router. The master routing protocol application provides the overall routing to its local controller, which subsequently distributes the routing table to the other local controllers for the other SRs.

Figure 9:
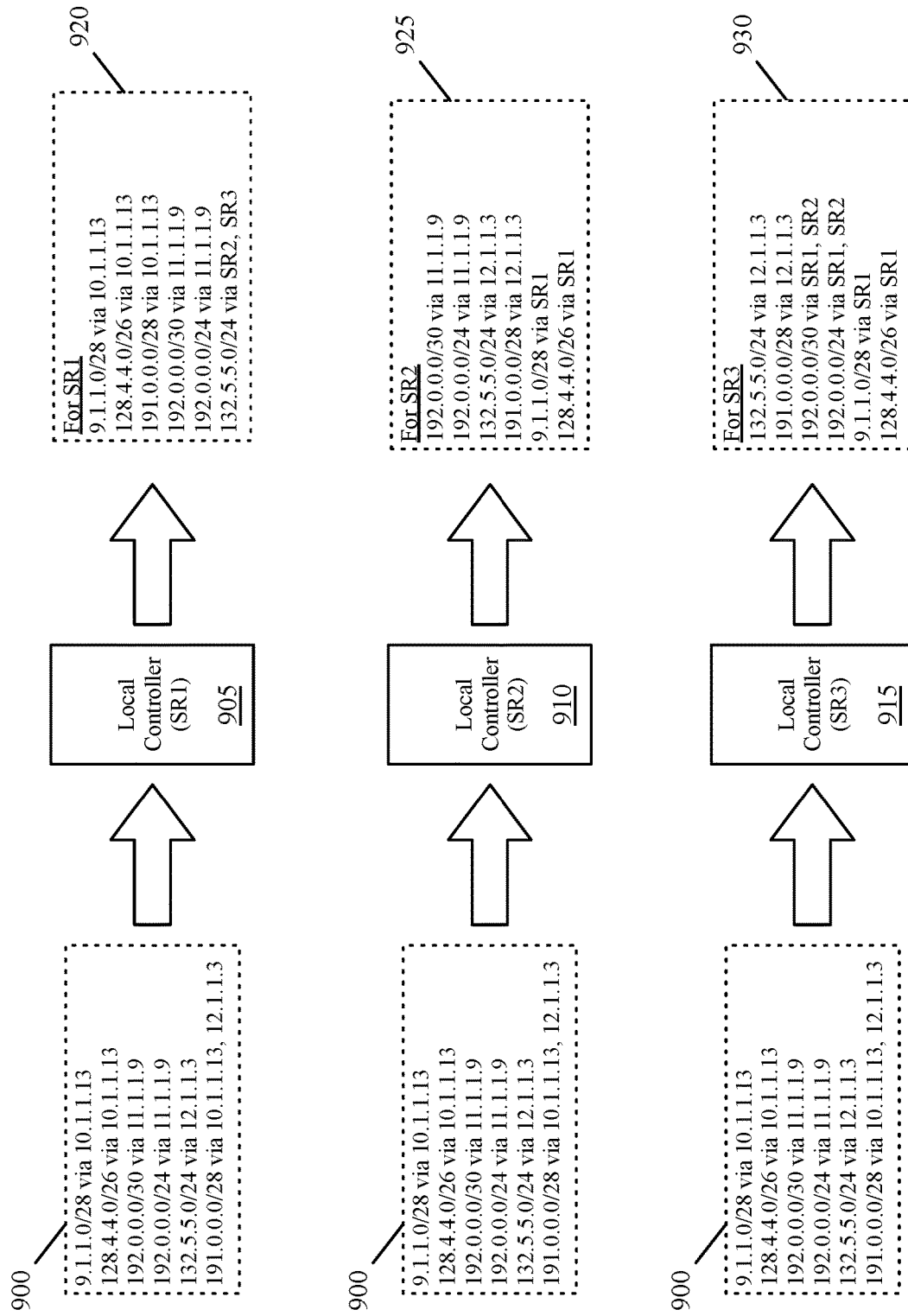
FIG. 9 conceptually illustrates the individualization of routing tables for the SRs of FIG. 6 by three separate local controllers.

As mentioned, FIG. 9 illustrates a routing table (FIB) 900 calculated by the master routing protocol application operating on the same gateway as one of the SRs 605-615 from FIG. 6. This routing table 900 has the same six routes as the routing table 705 of FIG. 7, but in this case the entire table is provided to each of the local controllers 905-915, which respectively manage the MFEs implementing SR1, SR2, and SR3.

The process 800 then determines how each route should be installed in the routing table for its local SR. As shown, the process selects (at 805) one of the routes from the received routing table. While the process shown in this figure processes each route one after the next, it should be understood that some embodiments may perform this process on multiple routes in parallel, or in other manners.

The process then determines (at 815) whether the selected route has at least one next hop accessible through a local connection. As noted above, routes computed based on the update information from routing protocol packets sent by external routers will generally specify one or more next hop addresses (e.g., interfaces of the external routers), which may or may not be locally accessible for any given SR. For example, in FIG. 6, next hop addresses on the subnet 10.1.1.0/24 and 11.1.1.0/24 are locally accessible for the first SR 605, but next hop addresses on 12.1.1.0/24 are not locally accessible for this SR.

If the route has at least one locally accessible next hop, then the process 800 adds (at 820) the route to the SR with all of the locally connected next hops. Thus, an ECMP route that specifies multiple next hop addresses that are locally connected to the SR will have multiple next hops in that SR's routing table. However, if an SR is only locally connected to a subset of the next hop addresses, then only that subset will be listed as next hops for the route in the SR's routing table.

Examples of these types of routes are shown in the routing tables 920-930 generated by the local controllers 905-915, respectively, for their local SRs. For instance, the first local controller 905 identifies that five of the six routes have locally connected interfaces for its SR 605, and thus adds these routes to the routing table 920 with the external router interface IPs as next hops. For one of these (for 191.0.0.0/28), only one of the two addresses is accessible, so this route is added with the single next hop address 10.1.1.13. For the second SR 610, its local controller 910 adds four routes with external router IP addresses as next hops (with the ECMP route for 191.0.0.0/28 using the only locally accessible next hop address 12.1.1.3). Lastly, for the third SR 615, the local controller 915 adds only two routes with external router IP addresses as next hops.

On the other hand, if the route does not have at least one locally accessible next hop, then the process 800 adds (at 825) the route to the SR with a different next hop address. Specifically, for the next hop address(es), the process uses the southbound interface address(es) of all SRs that are locally connected to the next hop(s) of the received route. That is, the local controller configures its SR to forward packets for addresses specified by the route to one of the other SRs via a tunnel, so that the other SR can forward the packet to the external router. By reference to FIG. 1, the southbound SR interfaces are those interfaces that logically connect to the transit logical switch 125.

In the examples of FIG. 9, each of the routing tables 920-930 includes at least one such route. The local controller 905 determines that the next hop 12.1.1.3 is not locally connected by its SR 605, but SRs 610 and 615 are equally connected to this address. As such, the route for 132.5.5.0/24 is added to the routing table 920 as an ECMP route, with next hop addresses of SR2 and SR3 (used to represent the southbound interface IP addresses for these SRs). Similarly, the local controller 910 determines that the routes for 9.1.1.0/28 and 128.4.4.0/26 do not specify any locally connected next hops for the SR 610, but based on the connectivity of SR 605 (to subnet 10.1.1.0/24), these routes are added to the routing table with the southbound interface IP address for SR1 as a next hop. The local controller 915 performs similar computation for four of the routes in the routing table 900 for its SR 615. Two of these are added as ECMP routes listing the southbound interface addresses of both SRs 605 and 610 as next hops, while others only list the address for SR 605.

After adding the route to the routing table with the appropriate set of next hop addresses, the process 800 determines (at 830) whether additional routes remain. If additional routes require processing, the process returns to 810 to add the next route to the routing table. Once all routes are processed, the process configures (at 835) the local MFE datapath with the SR routing table. In some embodiments, this entails modifying the rules in the configuration database entries for the SR to reflect the new additions to the routing table. The process 800 then ends.

In certain cases, one or more of the SRs and/or the routing protocol applications may become inoperative for some amount of time. In general, when a SR fails (e.g., the MFE fails), the routing protocol application has failed as well (as it cannot send or receive packets). The MFEs of some embodiments use a protocol such as bidirectional forwarding detection (BFD) to ensure that tunnels are up between host machines (both between two gateway host machines and between a gateway host machine and a host machine that hosts user DCNs), and this protocol allows the MFEs to identify when one has gone down, in which case the MFE or an agent running the protocol notifies the local controller on that host machine. If connectivity fails between a gateway host and an external router, in some embodiments the BFD sessions with the other gateways sets a diagnostic code (e.g., concatenated path down) to indicate that this connectivity is lost. In some embodiments, if the master routing protocol application loses external connectivity, then one of the standby (inactive) applications takes over.

In some embodiments, the response to such SR failure differs between active-active (i.e., all of the SRs are active, although only the one routing protocol application is master) and active-standby (i.e., one of the SRs is active and the others are standby SRs, often used with stateful services) configurations.

In the active-active case, when the failure occurs on the node hosting the active routing protocol application, the other SRs continue forwarding data traffic as is. In addition, the southbound IP addresses of the failed SR (i.e., those facing the DR) are distributed to the other SRs. In some embodiments, the local controllers elect a new master routing protocol application based on a deterministic priority/ranking algorithm (so that they all select the same application instance). Because the local controllers (at least the controller for the failed MFE) have the full routing table, this information can be distributed to the newly selected active routing protocol application, so that it does not have to start from scratch. In addition, when the previous master routing protocol application regains operation, some embodiments do not switch back to the old master, instead keeping the newly elected master in charge of the routing protocol control plane. This is done to prevent a second, unnecessary failover. In the failover situation, some embodiments use graceful restart at time of failover so that the datapath functions while the control plane managed by the routing protocol application re-converges.

When the datapath (MFE) fails on a gateway host that does not have the master routing protocol application, this may impact both data traffics as well as the adjacencies/neighborships for which that SR is responsible for forwarding the routing protocol packets. If the SRs use BFD to maintain connection with the physical routers, then the BFD failover detection time will determine the speed with which the north-south traffic is redistributed across the remaining gateways. The northbound IP addresses (uplink IPs) of the failed SR are not moved to other SRs, as these stay down until the SR returns to operation.

In the active-standby case, some embodiments treat BGP and OSPF differently. For BGP, some embodiments use AS-path-prepend for routes advertised for the standby SR. In the route server model described herein, this requires matching the source IP of the standby SR. Some embodiments use a field in the BGP route map table to match this source.

For OSPF, some embodiments use a higher interface cost in the updates for the standby SR. For redistributing routes into OSPF, some embodiments make these routes of type 1 external link-state advertisement (LSA), rather than type 2. This is because in the case of type 1, the cost to reach the autonomous system boundary router (ASBR) is also considered, and thus the higher interface cost is useful. For this feature, some embodiments also use a field in the redistribution table to set the path type to "type 1". One issue that can occur with OSPF in the route server mode described herein involves a split brain scenario. In this scenario, continuous route flaps and reconvergence could occur, with two routing protocol applications attempting to send information with the same router ID. However, the management plane or central controller can be added as a mediator in some embodiments to avoid being stuck in these split brain scenarios. The ranking/priority algorithm can be used in some embodiments to exit out of a split brain scenario.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
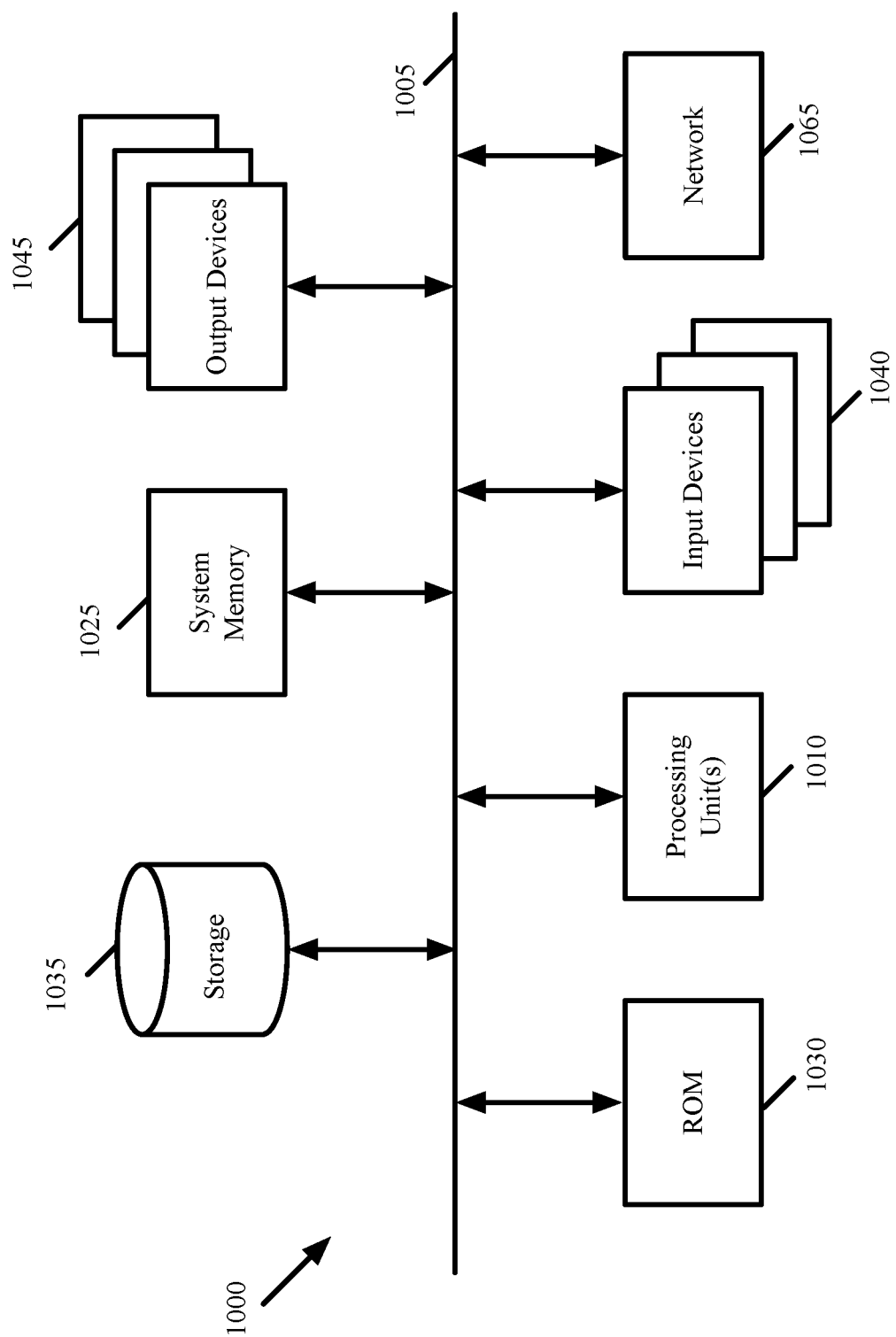
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A host computer comprising:
a set of processing units; and
a set of non-transitory machine-readable media storing:
a managed forwarding element that operates as a first centralized routing component of a plurality of centralized routing components of a logical router that operate on a plurality of host computers, the plurality of centralized routing components for connecting a logical network to one or more external networks;
a routing protocol application that operates as a route server to implement a dynamic routing protocol for the plurality of centralized routing components of the logical router; and
a network controller that receives a routing table from the routing protocol application, identifies routes in the routing table for each of the centralized routing components, and distributes the identified routes to the centralized routing components on the plurality of host computers.

2. The host computer of claim 1, wherein the routing protocol application is a first routing protocol application, wherein at least one other routing protocol application executes on at least one other host computer on which another of the centralized routing components operates.

3. The host computer of claim 2, wherein the first routing protocol application is a master routing protocol application that generates the routing table based on routing protocol messages received by the managed forwarding element and forwarded to the master routing protocol application, wherein the other routing protocol applications are standby routing protocol applications that do not generate routing tables for the centralized routing components.

4. The host computer of claim 3, wherein when the master routing protocol application or managed forwarding element on the host computer fails, one of the standby routing protocol applications is elected to take over as the master routing protocol application.

5. The host computer of claim 3, wherein the managed forwarding element is a first managed forwarding element and the host computer is a first host computer, wherein when a second managed forwarding element executing on a second host computer of the plurality of host computers as a second centralized routing component receives a routing protocol packet, the second managed forwarding element forwards the routing protocol packet to the first managed forwarding element on the first host computer.

6. The host computer of claim 5, wherein the second managed forwarding element classifies the routing protocol packet for less urgent processing than data traffic received by the second managed forwarding element.

7. The host computer of claim 1, wherein (i) the first centralized routing component connects to a first external subnet and not a second external subnet and (ii) a second centralized routing component in the plurality of centralized routing components connects to the second external subnet and not the first external subnet.

8. The host computer of claim 7, wherein the network controller stores information indicating the subnets to which each of the centralized routing components connect.

9. The host computer of claim 8, wherein the network controller identifies routes in the routing table for a particular one of the centralized routing components by identifying routes with next hops in the subnets to which the particular centralized routing component connects.

10. The host computer of claim 9, wherein routes with next hops in subnets to which the first centralized routing component does not connect are not sent to the first centralized routing component.

11. A system comprising:
a managed forwarding element to operate on a first host computer as a first centralized routing component of a plurality of centralized routing components of a logical router that operate on a plurality of host computers, the plurality of centralized routing components for connecting a logical network to one or more external networks;
a route server to implement a dynamic routing protocol for the plurality of centralized routing components of the logical router; and
a network controller to receive a routing table from the route server, identify routes in the routing table for each of the centralized routing components, and distribute the identified routes to the centralized routing components on the plurality of host computers.

12. The system of claim 11, wherein the route server is a first route server that executes on the first host computer, the system comprising a second route server executing on at least one a second host computer on which another of the centralized routing components operates.

13. The system of claim 12, wherein the first route server is a master routing protocol server that generates the routing table based on routing protocol messages received by the managed forwarding element and forwarded to the first route server, wherein the second route server is a standby route server that does not generate routing tables for the centralized routing components.

14. The system of claim 13, wherein when the master route server or managed forwarding element fails, the second route server takes over as the master route server.

15. The system of claim 13, wherein the managed forwarding element is a first managed forwarding element that executes on the first host computer, wherein when a second managed forwarding element executing on a second host computer of the plurality of host computers as a second centralized routing component receives a routing protocol packet, the second managed forwarding element forwards the routing protocol packet to the first managed forwarding element on the first host computer.

16. The system of claim 15, wherein the second managed forwarding element classifies the routing protocol packet for less urgent processing than data traffic received by the second managed forwarding element.

17. The system of claim 11, wherein (i) the first centralized routing component connects to a first external subnet and not a second external subnet and (ii) a second centralized routing component in the plurality of centralized routing components connects to the second external subnet and not the first external subnet.

18. The system of claim 17, wherein the network controller stores information indicating the subnets to which each of the centralized routing components connect.

19. The system of claim 18, wherein the network controller identifies routes in the routing table for a particular one of the centralized routing components by identifying routes with next hops in the subnets to which the particular centralized routing component connects.

20. The system of claim 19, wherein routes with next hops in subnets to which the first centralized routing component does not connect are not sent to the first centralized routing component.

* * * * *